Figure 1:
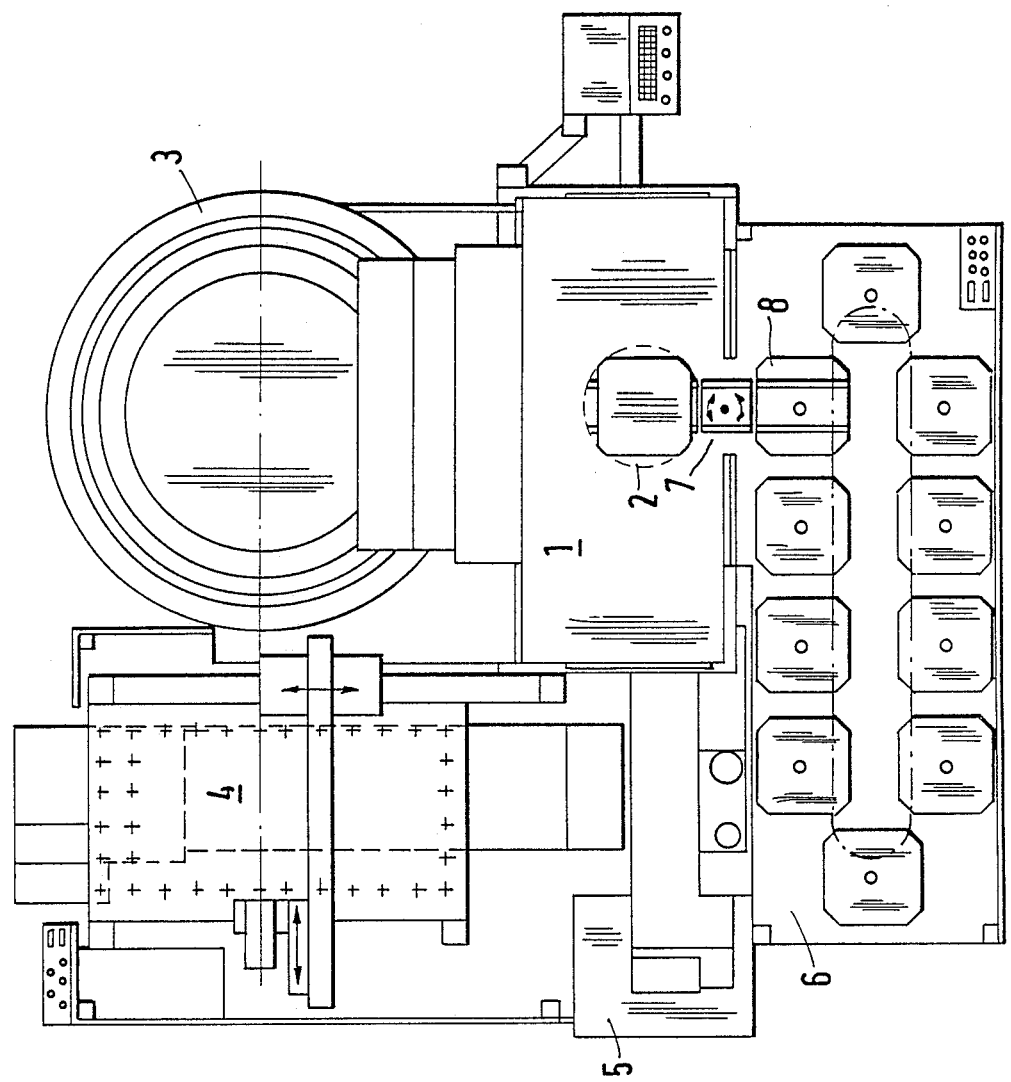

United States Patent [19]

Babel

[11] Patent Number: 4,901,840

[45] Date of Patent: Feb. 20, 1990

[54] APPARATUS FOR TRANSFERRING WORK-SUPPORTING PALLETS

[75] Inventor: Werner Babel, Pfronten, Fed. Rep. of Germany

[73] Assignee: Maho Aktiengesellschaft, Pfronten, Fed. Rep. of Germany

[21] Appl. No.: 351,305

[22] Filed: May 4, 1989

Related U.S. Application Data

[63] Continuation of Ser. No. 23,672, Mar. 9, 1987, abandoned, which is a continuation-in-part of Ser. No. 734,322, May 15, 1985, abandoned.

[30] Foreign Application Priority Data

May 28, 1984 [DE] Fed. Rep. of Germany ... 8416193[U]

[51] Int. Cl.4 .............................................. B65G 37/00
[52] U.S. Cl. ............................... 198/346.1; 198/465.1; 29/33 P
[58] Field of Search ............... 198/346.1, 465.1, 465.2, 198/465.3; 29/33 P, 563, 568; 414/222

[56] References Cited

U.S. PATENT DOCUMENTS

| | | | |
|---|---|---|---|
| 3,729,083 | 4/1973 | Wollenhaupt et al. | 198/345 |
| 3,825,245 | 7/1974 | Osburn et al. | 198/346.1 |
| 4,116,324 | 9/1978 | Burnmeister | 198/465.1 |
| 4,181,211 | 1/1980 | Nishimura et al. | 198/346.1 |
| 4,373,840 | 2/1983 | Miller | 198/346.1 |
| 4,461,379 | 7/1984 | Papp | 198/465.1 |
| 4,480,738 | 11/1984 | Mattson | 29/33 P |
| 4,494,282 | 1/1985 | Ida et al. | 198/345 |

FOREIGN PATENT DOCUMENTS

| | | | |
|---|---|---|---|
| 7729830 | 6/1979 | Fed. Rep. of Germany . | |
| 1463357 | 12/1966 | France | 198/346.1 |
| 2488177 | 2/1982 | France | 269/56 |
| 13068 | 5/1978 | Japan | 198/465.1 |
| 158781 | 12/1979 | Japan | 29/33 P |
| 90251 | 7/1980 | Japan | 29/33 P |
| 205039 | 12/1982 | Japan | 29/33 P |
| 59-19653 | 2/1984 | Japan . | |

Primary Examiner—Joseph E. Valenza
Attorney, Agent, or Firm—Lahive & Cockfield

[57] ABSTRACT

The subject matter of the invention is an apparatus for the transfer of pallets having workpieces clamped thereto between a pallet terminal and the work support of a machine tool. In order to permit positioning of the pallet terminal close to the machine tool with small dimensions, the apparatus is provided, according to the invention, with a pallet carrier (10) with longitudinal guides (11) arranged between the pallet terminal (6) and the work support (2). The apparatus is rotatable about its vertical axis (20) between an inoperative position and a transfer position and has motor-actuated pushers (18) for transporting the pallets (12).

6 Claims, 3 Drawing Sheets

APPARATUS FOR TRANSFERRING WORK-SUPPORTING PALLETS

This application is a continuation of application Ser. No. 023,672, filed 3/9/87 now abandoned, which is a continuation-in-part of U.S. Ser. No. 734,322, filed 5/15/85 (now abandoned).

Background

The invention relates to an apparatus for transferring pallets having workpieces clamped thereto between a pallet terminal and the work support of a machine tool.

The efficiency of modern program-controlled machine tools, especially of machining centers, is in practice frequently limited by the adjustment and positioning of the workpieces on the work support. In order to minimize the idle time of the machine tool, the individual workpieces are precisely clamped to suitable pallets and then positioned on the work support together with said pallets. The transfer to the work support from the pallet setup station, in which the unmachined parts are positioned on the pallet and the machined parts are removed from the pallet, is effected by suitable means of transportation. However, problems have arisen in cases where a multiplicity of pallets had to be kept in readiness in order to permit automatic operation, for example, for the duration of a whole shift without any manual interference. To this end so-called pallet terminals were developed which simultaneously perform the function of temporary storage for machining on a plurality of successively arranged machines. There have been space problems, because the pallet terminal had to accommodate a great number of individual pallets and, in addition, an operationaly safe transfer of the individual pallets from the transfer station of the pallet terminal to the work support—and vice versa—had to be warranted.

It is the object of the invention to provide a transfer apparatus for work-supporting pallets of the initially described type which requires only very small space in its operative position and thus permits positioning of the pallet terminal very close to the work support of the machine tool.

According to the invention, this object is realized in that a pallet carrier arranged between the pallet terminal and the work support is provided with longitudinal quides and is adapted to be rotated about its vertical axis between an inoperative position and a transfer position, and is provided with motor-actuated pushers to thereby shift the pallets.

By the embodiment of the pallet carrier so as to be rotatable about the vertical axis it can be rotated into an inoperative position, while the individual workpieces are machined; in said position it is disposed lengthwise between the pallet terminal and the front edge of the work support. Thus, the work support is disconnected from the pallet carrier and can perform the movements required for machining the workpiece, without any collision. This also applies to the movements of the pallets. In order to exchange a workpiece, the work support is moved into an exchange position in which its clamping area is aligned with the surface of the pallet carrier. The pallet carrier is rotated through an angle of 90° so that is longitudinal guides span the space between the clamping area of the work support and the transfer station of the pallet terminal. In this position the pallet with the machined workpiece resting on the work support is gripped by motor actuation of the pushers provided on the pallet carrier and is shifted along the guides to a vacant position on the pallet terminal. By further rotation of the pallet carrier through a 90° angle it is disconnected from the pallet terminal, and a new pallet with an unmachined workpiece can move into the transfer station. A further rotation of the pallet carrier reestablishes the connection with the work support, so that the pushers grip the pallet with the unmachined workpiece and can transfer it suitably in two steps to the work support in the desired machining position. A further rotation of the pallet carrier effects uncoupling thereof from the work support and from the pallet terminal.

Consequently, the essential functional feature of the transfer apparatus of the invention resides, inter alia, in the ability to establish a safe connection between the work support and the transfer station of the pallet terminal for the individual transfer operations, over which the individual pellets can then be transferred by way of simple conveyor means, and to separate said connection during machining and during pallet transportation in the terminal to such an extent that each of the two units can move freely.

According to a suitable embodiment of the invention, the pushers are mounted to at least one driven endless chain at spaced intervals corresponding substantially to the length of one pallet, the upper run of the endless chain extending parallel to the longitudinal guides on the pallet carrier. This embodiment of the invention is especially suitable inasmuch as, in a first cycle of movement, one of the pushers engages a leading abutment at the pallet and in this way pulls it away from the work support or from the transfer station and moves it in the guides of the pallet carrier a certain length of way. As soon as said pusher runs around the rear deflection roll of the endless chain, it automatically disengages from the abutment. At the same time, however, the next following pusher engages a rearward abutment of the pallet and thereby shifts the pallet a further length of way on the carrier and thereafter into the contemplated position either on the work support of the machine tool, or on the transfer station.

A corresponding mode of operation can also be performed by the use of at least two linear motors, e.g., hydraulic rams, arranged in parallel and side by side relationship along the length of the pallet carrier, if pushers are provided at the ends of the respective piston rods which engage the one or the other abutment of the pallet.

Figure 2:
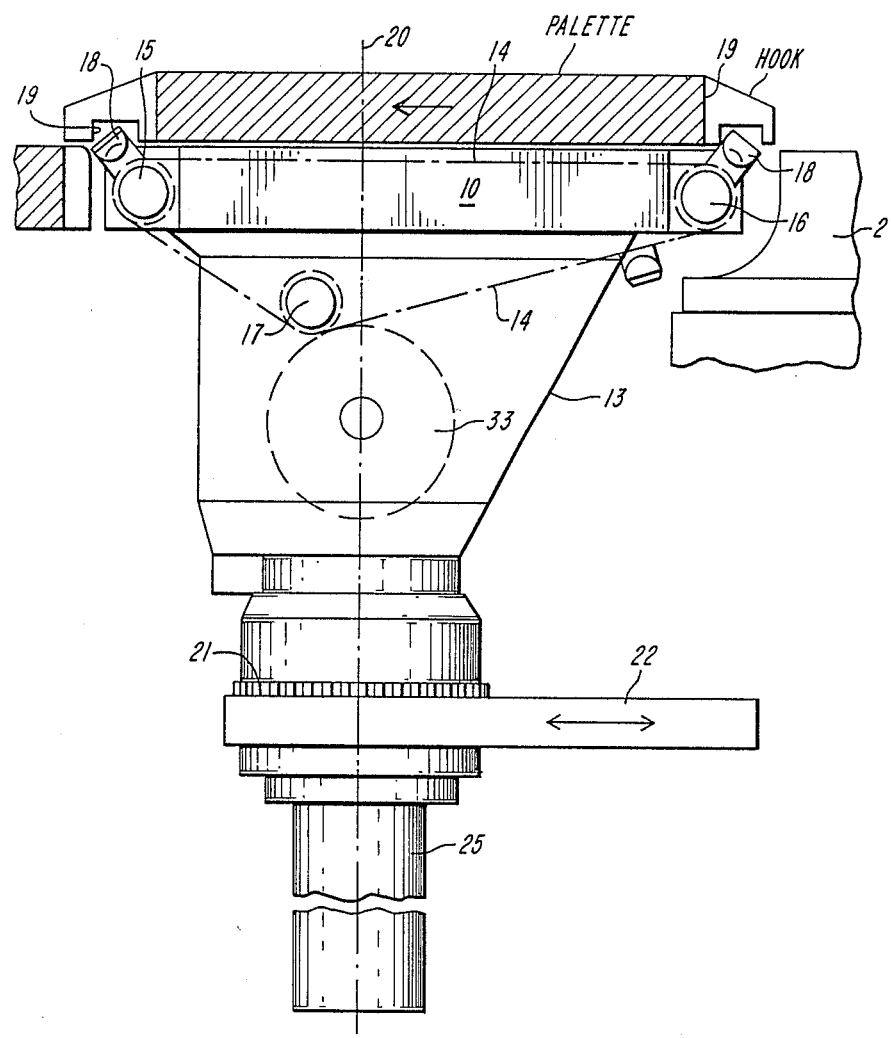
Figure 3:
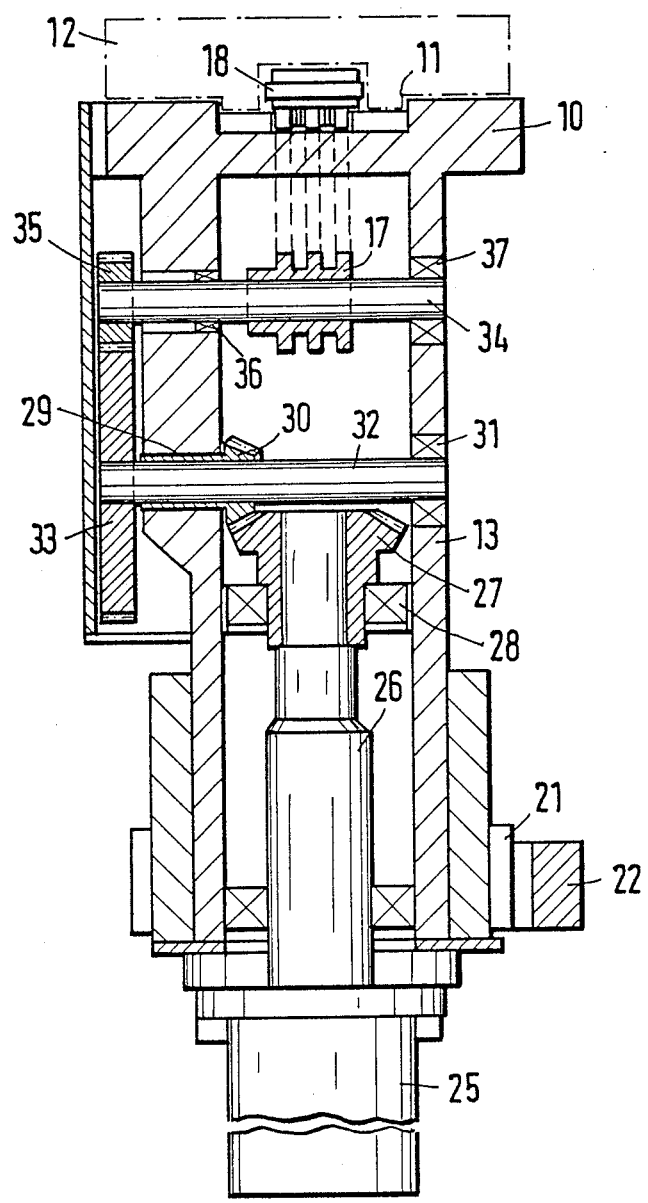

Hereafter an especially suitable example of the invention will be described in detail with reference to the drawing in which FIG. 1 shows a plan view of a machining center with pallet terminal and transfer apparatus;

FIG. 2 schematically illustrates a lateral view of a transfer apparatus;

FIG. 3 shown an axial section through the transfer apparatus illustrated in FIG. 2.

The machining center schematically shown in plan view comprises the machine 1 proper with work support 2, a plate magazine 3, a tool box 4, a chip bin 5, a pallet terminal 6, and the transfer apparatus 7 according to the invention which is arranged between the work support 2 and a pallet transfer position 8.

As will be seen from FIGS. 2 and 3, the transfer apparatus comprises a pallet carrier 10 with longitudinal guides 11 for a pallet 12 (FIG. 3). Said pallet carrier 10 is supported on, or is integral with a housing 13. In the middle of the pallet carrier there extends the upper run of an endless chain 14 trained about two deflecting rolls 15, 16 and driven by a sprocket wheel 17 supported in the interior of the housing 13. At predetermined spaced intervals along the endless chain 14 pushers 18 are mounted which engage the pallets 12 at matching abutments 19 upon movement of the endless chain 14, thereby moving the pallets 12 in longitudinal direction of the pallet carrier. The pallet carrier is rotatable about the vertical axis 20—in the illustrated embodiment by means of a rack gearing 21, 22. In the lower part of the housing a gear ring 21 is arranged which is in engagement with the toothing of a rack 22 movable translationally in the direction of the double arrow. Said rack is driven either by way of a pinion—not shown—or by way of hydraulic rams.

A transfer apparatus constructed in accord with the invention, as illustrated in FIG. 2, requires only a single transport means, viz., the endless chain 14 with pushers 18, for pulling a pallet 12 from the transfer position 8 of the pallet terminal 6 onto the pallet carrier 12 and for pushing it in a single movement entirely onto the work support 2 of the machine tool—and vice versa. To enable such operation, the pallet carrier 10 and the deflection rolls 15, 16 of the endless chain 14 must extend immediately below and adjacent the edge of the pallet resting on the transfer station 8 or the work support 2, or immediately below and adjacent the hoods so that a pusher or driver 18 can engage in the pallet recess 19. In order to provide this capability, a cut-out is provided into which a side portion of the transfer means or pallet carrier 10 projects when the transfer means is in its operating position shown in FIG. 2.

In the aforementioned operational position, position movements of the work support and/or of the pallet carrier of the pallet terminal 6 are not possible. In order to permit such movement, the pallet carrier 10 can be rotated about the vertical axis 20 so as to move side edges out of the recesses in the work support 2.

From FIG. 3 it is apparent that the sprocket wheel 17 is driven by a motor 25 whose drive shaft 26 is provided at its free end with a bevel gear 27 whose downwardly extended sleeve is supported in bearings 28 in the housing 13. The bevel gear 27 meshes with a bevel pinion 30 which is wedged on a shaft 32 rotatable in bearings 29, 31 in the housing. At the end of the shaft 32 a spur gear 33 is mounted which meshes with a spur pinion 35 wedged on the shaft 34 of the sprocket wheel 17. The shaft 34 is supported in bearings 36, 37 in the housing 13, in parallel to the shaft 32.

The invention is not limited to the illustrated example. Thus, for instance, in lieu of the endless chain 14 other suitable drive means can be provided whose pushers are differently designed gripper members seize the respective pallets and transport them from the transfer station on the pallet terminal to the machining position on the work support, and vice versa. Suitable drive means are, for example, linear motors designed as hydraulic rams or as circulating ball screws.

What is claimed is:

1. An apparatus for transferring pallets having workpieces clamped thereto in a straight line between a pallet terminal and a work support of a machine tool, said apparatus comprising
   a pallet carrier including longitudinal guides,
   said pallet carrier being disposed between the pallet terminal and the work support and being supported by means for rotation about its vertical axis between a non-aligned inoperative position, in which the pallet carrier is not enabled to transfer a pallet between the pallet terminal and the work support, and an aligned transfer position, in which the pallet carrier is enabled to transfer a pallet between the pallet terminal and the work support,
   said pallet carrier including motor-actuated pushers for transportation of the pallets,
   said pushers being mounted at predetermined spaced intervals on at least one driven endless chain which is longitudinally guided in the pallet carrier,
   a bottom region of said pallets including abutments for successive engagement by the pushers,
   said pallet carriers being arranged so that at least a first said pusher engages a leading abutment of a pallet for pulling said pallet onto said pallet carrier and for moving said pallet at least part way along said longitudinal guides,
   said pallet carrier being further arranged so that a final said pusher engages a rearward abutment of the pallet and thereby moves the pallet further along said longitudinal guides and onto either of said work terminal or said pallet terminal.

2. An apparatus according on claim 1, wherein the pallet carrier, together with its housing, is rotatable about the vertical axis through 90° in each direction of rotation by means of a rack and pinion drive.

3. An apparatus according to claim 1, wherein the endless chain is driven by an electric motor arranged along the vertical axis by way of a pair of bevel gears and a pair of step-down spur gears.

4. An apparatus for transferring pallets having workpieces clamped thereto in a straight line between a pallet terminal and a work support of a machine tool, said apparatus comprising
   a pallet carrier including longitudinal guides,
   said pallet carrier being disposed between the pallet terminal and the work support and being supported by means for rotation about its vertical axis between a non-aligned inoperative position, in which the pallet carrier is not enabled to transfer a pallet between the pallet terminal and the work support, and an aligned transfer position, in which the pallet carrier is enabled to transfer a pallet between the pallet terminal and the work support,
   said pallet carrier including motor-actuated pushers for transportation of the pallets,
   said pushers being mounted at predetermined spaced intervals on at least one driven endless chain which is longitudinally guided in the pallet carrier,
   a bottom region of said pallets including abutments for successive engagement by the pushers,
   said pallet carrier being arranged so that at least a first said pusher engages a leading abutment of a pallet for pulling said pallet onto said pallet carrier and for moving said pallet at least part way along said longitudinal guides,
   said pallet carrier being further arranged so that a final said pusher engages a rearward abutment of the pallet and thereby moves the pallet further along said longitudinal guides and onto either of said work terminal or said pallet terminal and said first pusher disengages from said leading abutment,
   said pallet carrier being arranged for pulling said pallet onto said pallet carrier, or moving said pallet along said longitudinal guides and for moving said pallet onto either of said work terminal or pallet terminal in a single motion, and said pushers are mounted at predetermined spaced intervals, said intervals being substantially equal to the length of said pallet in said longitudinal direction, on at least one driven endless chain which is longitudinally guided in the pallet carrier.

5. An apparatus according to claim 1 wherein said pallet carrier is arranged so that, when in the inoperative position, it does not interfere with normal movement of at least one of the pallet terminal and the work support.

6. An apparatus according to claim 5 wherein said pallet carrier is rectangular.

* * * * *

UNITED STATES PATENT AND TRADEMARK OFFICE
CERTIFICATE OF CORRECTION

PATENT NO. : 4,901,840

DATED : February 20, 1990

INVENTOR(S) : Werner Babel

It is certified that error appears in the above-identified patent and that said Letters Patent is hereby corrected as shown below:

Column 2, line 20, replace "pellets" with -- pallets --.

Column 3, line 55, replace "are" with -- or --.

Signed and Sealed this

Eighteenth Day of June, 1991

Attest:

HARRY F. MANBECK, JR.

Attesting Officer

Commissioner of Patents and Trademarks